(12) United States Patent (10) Patent No.: US 12,674,502 B2

Waltz et al. (45) Date of Patent: Jul. 7, 2026

(54) SPRING DAMPER WITH TWO OVERLOAD PROTECTION COUPLINGS, AND POWERTRAIN

(71) Applicant: Schaeffler Technologies AG & Co. KG, Herzogenaurach (DE)

(72) Inventors: Nicolas Waltz, Aschbach (FR); Mathieu Bertheleme, Strasbourg (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 464 days.

(21) Appl. No.: 18/276,158

(22) PCT Filed: Jan. 19, 2022

(86) PCT No.: PCT/DE2022/100048

§ 371 (c)(1),
(2) Date: Aug. 7, 2023

(87) PCT Pub. No.: WO2022/174861

PCT Pub. Date: Aug. 25, 2022

(65) Prior Publication Data

US 2024/0110612 A1 Apr. 4, 2024

(30) Foreign Application Priority Data

Feb. 19, 2021 (DE) ..................... 10 2021 103 932.0

(51) Int. Cl.
*F16D 7/02* (2006.01)
*F16F 15/129* (2006.01)
*F16F 15/139* (2006.01)

(52) U.S. Cl.
CPC ............................... *F16F 15/1397* (2013.01)

(58) Field of Classification Search
CPC ...... F16D 7/002; F16D 7/024; F16F 15/1297; F16F 15/1397
See application file for complete search history.

(56) References Cited

U.S. PATENT DOCUMENTS 4,790,419 A * 12/1988 Loizeau .............. F16F 15/1395
192/214.1
5,617,939 A * 4/1997 Memmel ............. F16F 15/1207
192/206

(Continued)

FOREIGN PATENT DOCUMENTS

CN 101305212 A 11/2008
CN 106467015 A 3/2017

(Continued)

OTHER PUBLICATIONS

Source: Office Action Corresponding to Chinese Patent Application No. 202280008316.8, dated Apr. 11, 2025, 13 Pages.

(Continued)

*Primary Examiner* — Thomas W Irvin

(57) ABSTRACT

A spring damper for a motor vehicle drive train includes a primary part, a secondary part, a hub element, a first overload protection coupling operatively inserted between the secondary part and the hub element and a second overload protection coupling. The secondary part is rotatably received relative to the primary part in a spring-damped manner. The first overload protection coupling includes an output and the second overload protection coupling is operatively inserted between the output and the hub element. The second overload protection coupling is arranged radially within the first overload protection coupling. The first overload protection coupling is closed below a threshold of a (Continued)

torque to be transmitted, and the first overload protection coupling releases a relative rotation between the secondary part and the hub element above the threshold.

17 Claims, 1 Drawing Sheet

(56) References Cited

U.S. PATENT DOCUMENTS

| | | | |
|---|---|---|---|
| 6,257,075 B1 | 7/2001 | Bachnak | |
| 8,939,843 B2* | 1/2015 | Copeland | F16D 65/0006 |
| | | | 192/214.1 |
| 9,151,332 B2* | 10/2015 | Jimbo | F16D 7/02 |
| 9,435,390 B2* | 9/2016 | Copeland | F16D 65/0006 |
| 11,236,812 B2* | 2/2022 | Canto Michelotti | F16D 3/72 |
| 11,293,409 B2* | 4/2022 | Heidenreich | F16D 7/025 |
| 11,460,088 B2* | 10/2022 | Tachiuchi | F16D 7/025 |
| 11,965,575 B2* | 4/2024 | Senoue | F16F 15/1297 |
| 2009/0139816 A1 | 6/2009 | Degler | |
| 2012/0234642 A1 | 9/2012 | Sekine | |
| 2013/0118859 A1* | 5/2013 | Copeland | F16D 13/22 |
| | | | 192/93 R |
| 2014/0221105 A1* | 8/2014 | Jimbo | F16F 15/1397 |
| | | | 464/45 |
| 2015/0053528 A1* | 2/2015 | Copeland | F16F 15/12373 |
| | | | 192/30 V |
| 2017/0043656 A1 | 2/2017 | Hashimoto | |
| 2018/0106355 A1* | 4/2018 | Canto Michelotti | F16D 3/72 |
| 2019/0376492 A1* | 12/2019 | Heidenreich | F16F 15/123 |
| 2020/0173521 A1* | 6/2020 | Tachiuchi | F16F 15/1297 |
| 2020/0292007 A1* | 9/2020 | Theriot | F16D 13/583 |
| 2021/0172495 A1* | 6/2021 | Mepham | F16D 7/027 |

FOREIGN PATENT DOCUMENTS

| | | |
|---|---|---|
| CN | 212155650 U | 12/2020 |
| DE | 10336161 A1 | 2/2005 |
| DE | 102011014337 A1 | 9/2012 |
| DE | 102018119505 A1 | 12/2019 |
| DE | 102020116180 A1 | 12/2020 |
| EP | 2765331 A2 | 8/2014 |
| JP | 2001173676 A | 6/2001 |
| JP | 2008304008 A | 12/2008 |
| JP | 2011074965 A | 4/2011 |
| JP | 2012087899 A | 5/2012 |
| JP | 2014152834 A | 8/2014 |
| JP | 2016056893 A | 4/2016 |
| JP | 6149415 B2 | 6/2017 |
| JP | 2020085246 A | 6/2020 |

OTHER PUBLICATIONS

Source: Office Action Corresponding to Chinese Patent Application No. 202280008316.8, dated Dec. 17, 2025, 12 Pages.

* cited by examiner

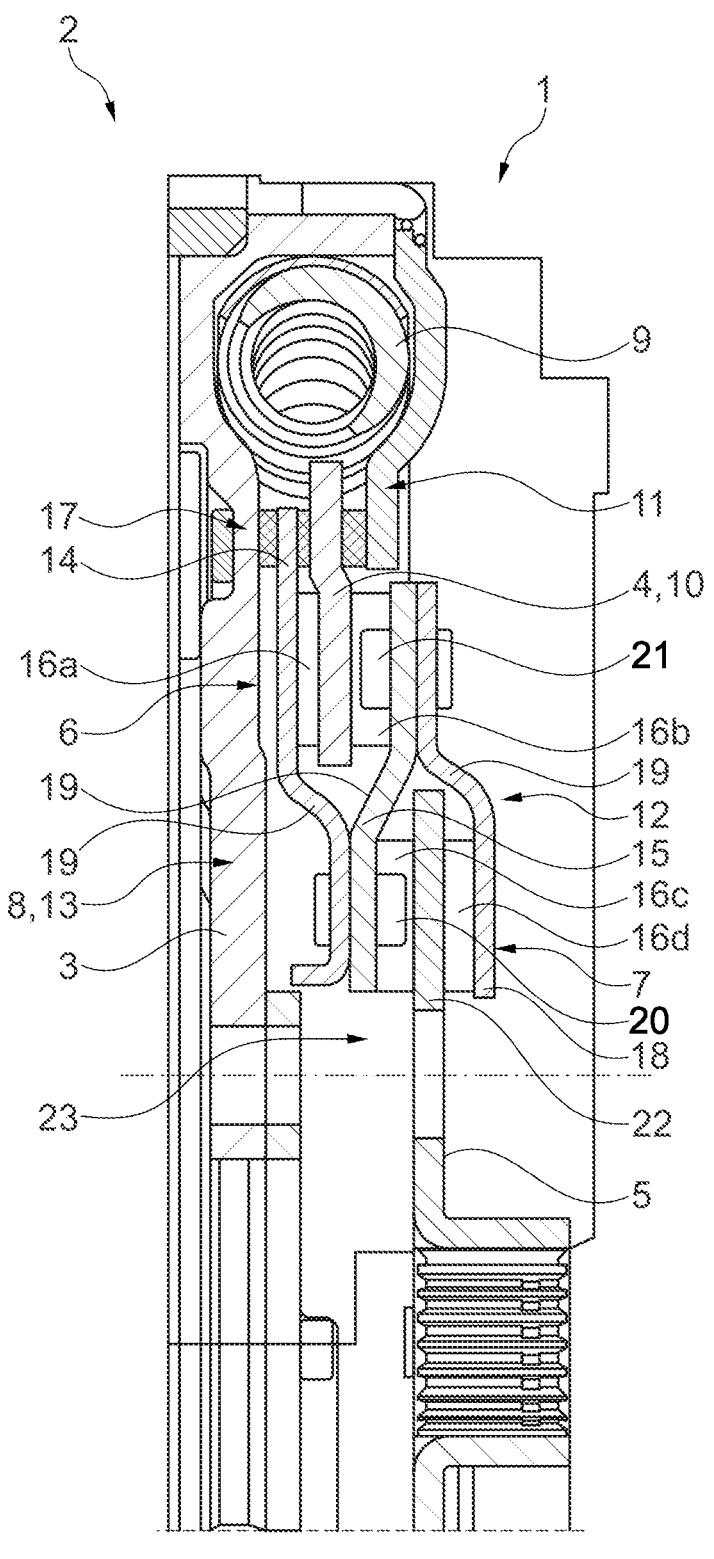

SPRING DAMPER WITH TWO OVERLOAD PROTECTION COUPLINGS, AND POWERTRAIN

CROSS-REFERENCE TO RELATED APPLICATIONS

This application is the United States National Phase of PCT Appln. No. PCT/DE2022/100048 filed Jan. 19, 2022, which claims priority to German Application No. DE102021103932.0 filed Feb. 19, 2021, the entire disclosures of which are incorporated by reference herein.

TECHNICAL FIELD

The present disclosure relates to a spring damper for a motor vehicle drive train, e.g., for a hybrid drive train of a motor vehicle, such as a car, truck, bus or other commercial vehicle, including a primary part, a secondary part which is rotatably received relative to the primary part in a spring-damped manner, and a first overload protection coupling. which is operatively inserted between the secondary part and a hub element. The first overload protection coupling is permanently closed below a threshold of a torque to be transmitted and releases a relative rotation between the secondary part and the hub element above said threshold at least in the event of an abrupt torque to be transmitted. In addition, the present disclosure relates to a drive train having this spring damper.

BACKGROUND

Spring dampers of the type in question used in drive trains are already well known in the prior art. For example, EP 2 765 331 A2 discloses a power transmission device having a damping component, a hysteresis generating component, and a speed limiting component.

Thus, spring dampers with torque limiters in the form of overload protection couplings are already known, wherein the torque limiters can also be used at different positions. However, it has been found that the spring dampers used often have a relatively complex structure with a large number of components and a relatively high mass inertia. The torque limiters are also usually positioned as close as possible to the damper springs in order to adequately protect this region in the event of a torque impulse. However, this means that the component of the spring damper that is further connected to the transmission input shaft during operation has a relatively high mass moment of inertia, which in turn can lead to relatively high torque loads on the part of the transmission input shaft and from there further in the transmission. The transmission input shaft and consequently the connected elements in the transmission, such as gears, etc., can thus be overloaded in certain operating states.

SUMMARY

The present disclosure provides a spring damper which is robust and durable, and which prevents overloading of a transmission connected in operation even when torque impulses occur.

According to the present disclosure, this is achieved in that a second overload protection coupling is operatively inserted radially within the first overload protection coupling between an output of the first overload protection coupling and the hub element. Consequently, a second overload protection coupling is now inserted in series with the previous first overload protection coupling. The second overload protection coupling is also designed in such a way that it is permanently closed below a threshold of a torque to be transmitted and releases a relative rotation between the output and the hub element above said threshold at least in the event of an abrupt torque to be transmitted, in particular in traction operation.

One overload protection coupling, in this case the first overload protection coupling, is inserted close to the damping mechanism of the spring damper, i.e., the damper springs, and another overload protection coupling, in this case the second overload protection coupling, is inserted close to the transmission input shaft. This provides reliable protection of both the transmission input shaft and the damping mechanism of the spring damper. The damper springs can be designed to be weaker and therefore more compact than in previously known variants.

In order to further reduce the torque load, the secondary part may have a flange element supported directly in the circumferential direction on a damper spring, which flange element in turn directly forms an input of the first overload protection coupling.

The overload protection couplings can also be produced easily if the output of the first overload protection coupling is formed by a multi-part support segment and at the same time forms an input of the second overload protection coupling.

The support segment may have a first disk region and a second disk region connected to the first disk region. The secondary part, e.g., the flange element, is clamped axially between the first disk region and the second disk region. The first disk region and the second disk region may each be formed as a sheet metal element/from a metal sheet. This allows the disk regions to be produced easily.

For the first overload protection coupling to be effective, the first disk region and the second disk region may each receive a friction lining (directly) bearing against the secondary part.

Production is further simplified if both the first disk region and the second disk region are each formed by a single sheet, which are axially spaced apart in the region of the friction linings, accommodating the flange element, and are in contact with one another radially within the friction linings/are axially supported against one another and are directly connected to one another there, e.g., by a riveted connection. This allows efficient assembly as well as attachment of the first and second disk regions to one another.

If the first disk region is also in contact with the primary part via a friction device, the damping effect of the spring damper is further improved.

Furthermore, the support segment may have a third disk region, which is connected to the second disk region, and the hub element is clamped axially between the second disk region and the third disk region. The third disk region may also be formed by a single sheet directly connected to the sheet of the second disk region. This also has a positive effect on the assembly and structure of the second overload protection coupling.

In this respect, the second disk region and the third disk region or the sheets forming these second and third disk regions may bear directly against one another radially outside multiple friction linings of the second overload protection coupling and may beattached to one another there, e.g., by means of riveting.

Accordingly, the second disk region and the third disk region may each receive a friction lining bearing against the hub element.

Furthermore, the present disclosure relates to a drive train for a motor vehicle, having a spring damper according to at least one of the embodiments described above. The primary part is connected to an output shaft of a motor and the hub element is connected to a transmission input shaft.

In other words, a spring damper, e.g., in the form of an arc spring damper, is thus implemented according to the disclosure, having a first radially outer slip coupling (first overload protection coupling) arranged near the arc springs (damper springs) and a second radially inner slip coupling (second overload protection coupling) arranged near the output shaft (i.e., near the transmission input shaft). Both slip couplings are connected in series and adjusted such that both the arc spring flange (flange element) and the transmission input shaft can, in each case, slip with a low mass moment of inertia in case of an impact.

BRIEF DESCRIPTION OF THE DRAWINGS

In the following, the disclosure is now explained in more detail by means of a FIGURE.

The single FIGURE shows a longitudinal sectional view of a spring damper according to an exemplary embodiment, and the detailed structure of two inserted overload protection couplings can be clearly seen.

DETAILED DESCRIPTION

The spring damper 1 according to the disclosure shown in the single FIGURE is inserted in operation in a drive train 2 of a motor vehicle, in this case a hybrid drive train 2, which is indicated in principle. The spring damper 1 is operatively inserted between an output shaft of a motor, e.g., an internal combustion engine, which is not shown here for the sake of clarity, and a transmission input shaft of a transmission. Consequently, the spring damper 1 serves to dampen certain torque peaks that occur between the motor and the transmission during operation.

The spring damper 1 according to the single FIGURE has, on the one hand, a housing-like primary part 3 which, in operation, may be directly connected in a non-rotatable manner to the output shaft of the motor, which is not shown further for the sake of clarity. In addition to the primary part, the spring damper 1 also has a secondary part 4 rotatably received relative to the primary part 3 in a spring-damped manner. The primary part 3 and secondary part 4 are supported in a spring-damped manner relative to one another by means of several damper springs 9 arranged distributed in the circumferential direction, here in the form of arc springs.

In addition to the resilient support of the primary part 3 relative to the secondary part 4 by the damper springs 9, an additional friction device 17 serves to generate the necessary damping effect, i.e., to convert the kinetic energy into waste heat. The friction device 17 is operatively inserted between the primary part 3 and the secondary part 4 and has an inhibiting effect on their relative rotation.

The secondary part 4 is formed substantially by a flange element 10 extending radially inwardly away from a region in contact with the damper springs 9. A first overload protection coupling 6 is directly arranged/inserted on the flange element 10. The flange element 10 thus directly forms an input 11 of the first overload protection coupling 6 and is operatively connected to an output 8 of the first overload protection coupling 6 via two (first and second) friction linings 16a, 16b. The first overload protection coupling 6 is implemented as a conventional slip coupling, which is permanently closed below a certain threshold of a torque to be transmitted and therein permanently connects the flange element 10 in a non-rotatable manner by frictional engagement with the output 8 of the first overload protection coupling 6 and releases/enables a relative rotation between the flange element 10 and the output 8 of the first overload protection coupling 6 when this threshold is exceeded, e.g., when a torque impulse occurs above the threshold.

With regard to the output 8 of the first overload protection coupling 6, it is further shown that this is also formed by a multi-part support segment 12. The support segment 12 has a first disk region 14 and a second disk region 15 fixedly connected thereto. The first disk region 14 and the second disk region 15 are guided radially within the first friction lining 16a and the second friction lining 16b with one another, forming an axial shoulder 19 per (first and second) disk region 14, 15, and are in contact with one another. The two first and second disk regions 14, 15 are connected together in this contact region by a first riveting 20.

Radially outside this first riveting 20, through the formation of the shoulder 19, the two disk regions 14, 15 are, in turn, axially spaced apart from one another and axially receive the flange element 10 between them, with the interposition of the respective friction lining 16a, 16b. The flange element 10 is thus clamped between the two disk regions 14, 15.

With regard to the first disk region 14, it is also evident that it is continued radially outside the friction linings 16a, 16b and forms a component of the friction device 17. The first disk region 14 is thus also in frictional contact with the primary part 3.

The support segment 12 also forms an input 13 of the second overload protection coupling 7, so that the second overload protection coupling 7 is arranged in series with the first overload protection coupling 6. On an axial side of the second disk region 15 facing away from the first disk region 14, a third disk region 18 is attached to this second disk region 15 for this purpose. The second disk region 15 is connected to the third disk region 18 by a further (second) riveting 21. In this embodiment, the second riveting 21 is arranged radially at the same level as the first and second friction linings 16a, 16b.

Radially within the second riveting 21, the second and third disk regions 15, 18 are axially spaced apart to one another by the respective formation of the shoulder 19, and axially receive a hub element 5 or a flange region 22 of the hub element 5, respectively, between them. It should be noted that the first riveting 20 is radially located at the level of the third and fourth friction linings 16c, 16d.

The flange region 22 is clamped between the second disk region 15 and the third disk region 18 in a manner similar to the clamping of the flange element 10 between the first disk region 14 and the second disk region 15. Consequently, the flange region 22 is clamped axially between the second disk region 15 and the third disk region 18 with the interposition of a third friction lining 16c and a fourth friction lining 16d.

The function of the second overload protection coupling 7 is similar to the first overload protection coupling 6. When a certain threshold of a torque/torque impulse to be transmitted is exceeded, the second overload protection coupling 7 opens automatically and thus allows the hub element 5 to rotate relative to the support segment 12 and consequently relative to the secondary part 4, whereas below this threshold there is a non-rotatable connection between the hub element 5 and the support segment 12. Consequently, the hub element 5 forms an output 23 of the second overload protection coupling 7.

The third and fourth friction linings 16c, 16d are located radially within the first and second friction linings 16a, 16b. In addition, the friction lining assembly having the first and second friction linings 16a, 16b is arranged at least partially axially overlapping with the friction lining assembly having the third and fourth friction linings 16c, 16d.

With regard to the disk regions 14, 15, 18, it should also be noted that these are each formed from a metal sheet. In this regard, the shoulders 19 may be produced using cold forming.

In other words, according to the disclosure, a damper (spring damper 1) with a double torque limiter (first and second overload protection coupling 6, 7) is implemented. In this case, there is one torque limiter (second overload protection coupling 7) that protects the transmission input shaft and another one (first overload protection coupling 6) that protects the arc springs (damper springs 9).

The concept is structured as follows: The hub (hub element 5) serves as a rotating part in the torque limiter. It is placed between two coupling linings (third and fourth friction linings 16c, 16d) so that the slip function can be ensured in the event of an impact. The coupling linings are mounted on the support sheets (second disk region 15 and third disk region 18). The support sheets are connected to one another by a riveting (second riveting 21). These parts form that (second) torque limiter, which serves to protect the transmission.

The support sheet (second disk region 15) is connected to the support sheet (first disk region 14) by a riveting (first riveting 20). The two coupling linings (first and second friction linings 16a, 16b) are mounted on the support sheets (first disk region 14 and second disk region 15). The arc spring flange (flange element 10) is located between the two coupling linings (first and second friction linings 16a, 16b). This serves as a rotating part in the torque limiter, so that the slip function can be ensured in the event of an impact. These parts form the (first) torque limiter, which protects the arc springs of the damper.

Both torque limiters are connected to one another via the support sheet (second disk region 15) and form one and the same part (rigid connection) in normal traction operation. In traction operation, therefore, the mass moment of inertia of parts 5, 18, 15, 20, 16c, 16d, 14, 21, 16a, 16b, 10 acts on the transmission input shaft.

In the event of an impact (e.g., during emergency braking), the transmission input shaft and hub can slip with a very low mass moment of inertia on the transmission input shaft. In parallel, the arc spring flange can also slip separately with a very low mass moment of inertia on the arc spring. This concept allows for the design of optimal and soft arc spring characteristics with optimal protection functions.

REFERENCE NUMERALS

1 Spring damper
2 Drive train
3 Primary part
4 Secondary part
5 Hub element
6 First overload protection coupling
7 Second overload protection coupling
8 Output of the first overload protection coupling
9 Damper element
10 Flange element
11 Input of the first overload protection coupling
12 Support segment
13 Input of the second overload protection coupling
14 First disk region
15 Second disk region
16a First friction lining
16b Second friction lining
16c Third friction lining
16d Fourth friction lining
17 Friction device
18 Third disk region
19 Shoulder
20 First riveting
21 Second riveting
22 Flange region
23 Output of the second overload protection coupling

The invention claimed is:

1. A spring damper for a motor vehicle drive train, comprising a primary part, a secondary part which is rotatably received relative to the primary part in a spring-damped manner, and a first overload protection coupling which is operatively inserted between the secondary part and a hub element and which is permanently closed below a threshold of a torque to be transmitted and releases a relative rotation between the secondary part and the hub element above said threshold at least in the event of an abrupt torque to be transmitted, wherein a second overload protection coupling is operatively inserted radially within the first overload protection coupling between an output of the first overload protection coupling and the hub element.

2. The spring damper according to claim 1, wherein the secondary part has a flange element supported directly in the circumferential direction on a damper spring, which flange element in turn directly forms an input of the first overload protection coupling.

3. The spring damper according to claim 1, wherein the output of the first overload protection coupling is formed by a multi-part support segment and at the same time forms an input of the second overload protection coupling.

4. The spring damper according to claim 3, wherein the support segment has a first disk region and a second disk region connected to the first disk region, wherein the secondary part is clamped axially between the first disk region and the second disk region.

5. The spring damper according to claim 4, wherein the first disk region and the second disk region each receive a friction lining bearing against the secondary part.

6. The spring damper according to claim 4, wherein the first disk region is also in contact with the primary part via a friction device.

7. The spring damper according to claim 1, wherein the support segment has a third disk region, which is connected to the second disk region, wherein the hub element is clamped axially between the second disk region and the third disk region.

8. The spring damper according to claim 7, wherein the second disk region and the third disk region each receive a friction lining bearing against the hub element.

9. A drive train for a motor vehicle, having a spring damper according to claim 1, wherein the primary part is connected to an output shaft of a motor and the hub element is connected to a transmission input shaft.

10. A spring damper for a motor vehicle drive train, comprising:

a primary part;

a secondary part rotatably received relative to the primary part in a spring-damped manner;

a hub element;

a first overload protection coupling operatively inserted between the secondary part and the hub element and comprising an output; and, a second overload protection coupling arranged radially within the first overload protection coupling and operatively inserted between the output and the hub element, wherein:

the first overload protection coupling is closed below a threshold of a torque to be transmitted; and the first overload protection coupling releases a relative rotation between the secondary part and the hub element above the threshold.

11. The spring damper of claim 10, wherein:

the secondary part comprises a flange element supported directly on a damper spring; and the flange element directly forms an input of the first overload protection coupling.

12. The spring damper of claim 10, wherein:

the output is formed by a multi-part support segment; and the output forms an input of the second overload protection coupling.

13. The spring damper of claim 12, wherein:

the multi-part support segment comprises:

a first disk region; and a second disk region, fixed to the first disk region; and the secondary part is clamped axially between the first disk region and the second disk region.

14. The spring damper of claim 13, wherein:

the first disk region comprises a first friction lining bearing against the secondary part; and the second disk region comprises a second friction lining bearing against the secondary part.

15. The spring damper of claim 13 further comprising a friction device, wherein the first disk region contacts the primary part through the friction device.

16. The spring damper of claim 13, wherein:

the multi-part support segment further comprises a third disk region fixed to the second disk region; and the hub element is clamped axially between the second disk region and the third disk region.

17. The spring damper of claim 16, wherein:

the second disk region comprises a third friction lining bearing against the hub element; and the third disk region comprises a fourth friction lining bearing against the hub element.

\* \* \* \* \*